(12) United States Patent
Dobele et al.

(10) Patent No.: US 8,668,622 B2
(45) Date of Patent: Mar. 11, 2014

(54) SHIFT CONTROL METHOD IN AN AUTOMATED MANUAL TRANSMISSION

(75) Inventors: Bernd Dobele, Salem (DE); Norbert Wiencek, Hagnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 762 days.

(21) Appl. No.: 12/934,168

(22) PCT Filed: Mar. 23, 2009

(86) PCT No.: PCT/EP2009/053348
§ 371 (c)(1),
(2), (4) Date: Sep. 23, 2010

(87) PCT Pub. No.: WO2009/135725
PCT Pub. Date: Nov. 12, 2009

(65) Prior Publication Data
US 2011/0021315 A1    Jan. 27, 2011

(30) Foreign Application Priority Data

May 9, 2008  (DE) .......................... 10 2008 001 686

(51) Int. Cl.
*B60W 10/02*    (2006.01)
(52) U.S. Cl.
USPC .......................................................... 477/71
(58) Field of Classification Search
None
See application file for complete search history.

(56) References Cited

U.S. PATENT DOCUMENTS

| | | |
|---|---|---|
| 5,593,363 A | 1/1997 | Asai et al. |
| 7,632,211 B2 | 12/2009 | Groner et al. |
| 2003/0022754 A1 | 1/2003 | Koga |

FOREIGN PATENT DOCUMENTS

| | | |
|---|---|---|
| DE | 102 42 823 A1 | 3/2004 |
| DE | 10 2005 002 496 A1 | 7/2006 |
| EP | 1 273 831 A2 | 1/2003 |
| JP | H0958303 A | 3/1997 |
| WO | 2004/027287 A1 | 4/2004 |
| WO | 2005/065982 A1 | 7/2005 |

OTHER PUBLICATIONS

Japanese Office Action issued in corresponding Japanese Application No. 2011-507851 mailed Sep. 10, 2013.

*Primary Examiner* — Erin D Bishop
(74) *Attorney, Agent, or Firm* — Davis & Bujold, PLLC; Michael J. Bujold

(57) ABSTRACT

A shift control method for an automated gearshift transmission arranged in a drivetrain of a motor vehicle, between a drive motor and an axle drive, which is provided with unsynchronized gear clutches and whose input shaft can be connected to the driveshaft of the drive motor by an automatically controllable separator clutch such that, for an upshift, the synchronization of the target gear takes place with the separator clutch disengaged by setting a substantially constant braking torque at a transmission brake in driving connection with the input shaft. In order to speed up the shift sequence, without additional design measures, as the input speed of the gear clutch of the target gear approaches its output speed, to complete the synchronization, the separator clutch is partially engaged and then disengaged again substantially simultaneously as the transmission brake is released.

11 Claims, 1 Drawing Sheet

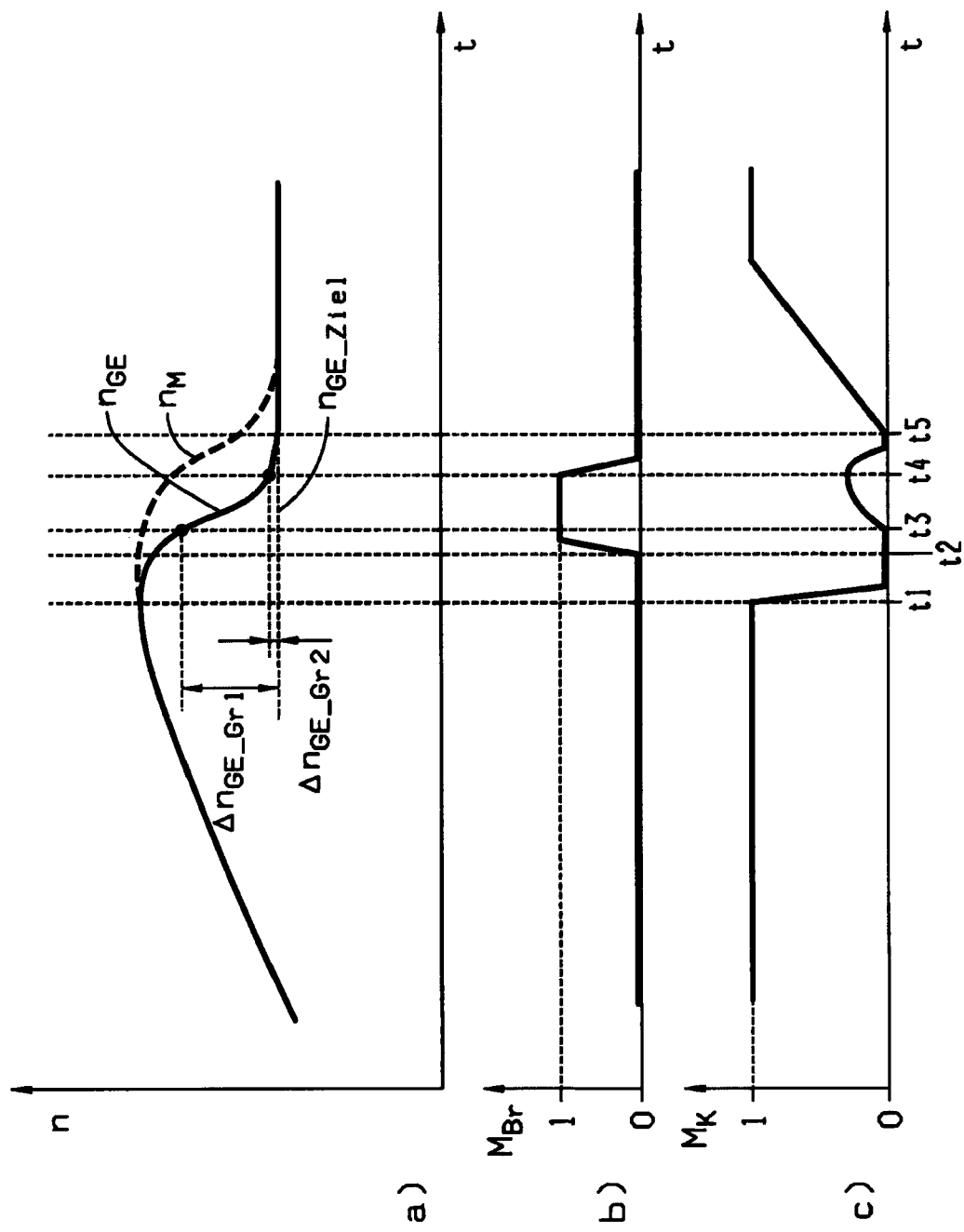

SHIFT CONTROL METHOD IN AN AUTOMATED MANUAL TRANSMISSION

This application is a National Stage completion of PCT/EP2009/053348 filed Mar. 23, 2009, which claims priority from German patent application serial no. 10 2008 001 686.1 filed May 9, 2008.

FIELD OF THE INVENTION

The invention concerns a shift control method for an automated manual transmission arranged in a drivetrain of a motor vehicle between a drive motor and an axle drive, which is provided with unsynchronized gear clutches and whose input shaft can be connected by means of an automated, controllable separator clutch to the driveshaft of the drive motor, such that during an upshift the synchronization of the target gear takes place with the separator clutch open, by setting a substantially constant braking torque at a transmission brake which is in drive connection with the input shaft.

BACKGROUND OF THE INVENTION

In a gearshift transmission, when shifting between a gear under load and a target gear, after the loaded gear has been disengaged a speed difference occurs at the transmission-internal gear clutch associated with the target gear and still disengaged, and this has to be equalized before the target gear is engaged, i.e. before the gear clutch concerned is engaged. This process is generally known as synchronization and takes place in practice by speed adaptation of the input-side part of the gear clutch which is in drive connection with the input shaft of the gearshift transmission.

During an upshift, after the loaded gear has been disengaged the input-side part of the gear clutch of the target gear rotates faster than the output-side part of the gear clutch, so that to synchronize the target gear the input shaft must be slowed down. In contrast, during a downshift, after the loaded gear has been disengaged the input-side part of the gear clutch of the target gear rotates more slowly than the output-side part or the gear clutch, so that to synchronize the target gear the input shaft must be speeded up.

In a gearshift transmission provided with synchronized gear clutches the synchronization of the target gear concerned or the gear clutch associated with that target gear is done by means of a friction-ring synchronizer device connected upstream from the actual gear clutch, which latter is provided with clutch tooth arrays that engage with one another by a positive interlock. During the synchronization of the target gear the speed difference at the gear clutch is equalized passively, i.e. by the action of the shifting force concerned, by virtue of frictional torque produced between the friction rings of the synchronizer device, before the gear clutch engages under the action of the shifting force so that the target gear can be engaged. Such lock-synchronized gear clutches, however, are of a relatively complex structure and are therefore relatively expensive to manufacture. Moreover, within the gearshift transmission, synchronized gear clutches take up a relatively large amount of space thus increasing the dimensions and weight of the gearshift transmission. Besides, since the way in which the synchronizer device works involves wear, the life of a gearshift transmission provided with synchronized gear clutches is necessarily limited.

In contrast to the above, unsynchronized gear clutches, which are generally referred to as claw clutches, are of simple and compact design, can be produced inexpensively, and during appropriately carried out shifts are little affected by wear so that they have a long life. However, in a manual transmission provided with unsynchronized gear clutches separate synchronization of the target gear concerned or the gear clutch associated with it is necessary. For the separate synchronization of the target gear it is known, for example, to slow down the input shaft of the manual transmission during an upshift by means of a transmission brake arranged on the input shaft or on a countershaft in driving connection therewith, and during a downshift to speed it up by partially engaging the separator clutch in combination with controlling the speed of the drive motor, which preferably consists of an internal combustion piston engine.

In such a case one begins with a transmission brake which cannot be adjusted but, by virtue of its design or by appropriate actuation with a constant contact force or a constant pressure, can be set to a constant braking torque $M_{Br}$. The transmission brake and the associated actuating device can then have a simple, compact and inexpensive structure, which enables relatively simple integration into an existing manual transmission. However, the substantially constant braking torque $M_{Br}$ of the transmission brake may deviate from a nominal value due to external influences such as the ambient or operating temperature at the time and the wear condition of the friction linings, whereby the synchronization of the target gear in an upshift can be slowed down or speeded up. The separator clutch is an automated controllable friction clutch, which is used as the starting and shifting clutch, i.e. which is disengaged and engaged in a controlled manner for starting and shifting processes.

The arrangement of a transmission brake on the input shaft of a manual transmission made as a group transmission comprising a main transmission with a range group connected downstream from it is known, for example, from DE 10 2005 002 496 A1 (see FIG. 1 therein), in which the main transmission is designed as a multi-stage countershaft transmission and the range group as a two-stage planetary transmission. In contrast, the arrangement of a transmission brake on a countershaft in driving connection via an input gearwheel pair (input constant) with the input shaft in a manual transmission of countershaft design, is described in DE 102 42 823 A1 (see FIG. 3 therein).

In an upshift, to achieve rapid synchronization of the target gear and problem-free engagement of the unsynchronized gear clutch of the target gear, the braking action of the transmission brake, i.e. its braking torque $M_{Br}$, should be as high as possible, the transmission brake should be engaged until the synchronous speed at the gear clutch concerned has nearly been reached, the transmission brake should be released when the gear clutch is engaged after an asymptotic approach of the input speed $n_{GKE}$ to the output speed $n_{GKA}$, of the gear clutch of the target gear, and when the gear clutch is engaged, to assist the meshing of the clutch teeth there should still be a very small speed difference at the gear clutch. However, these requirements cannot be fulfilled solely by a transmission brake whose braking torque $M_{Br}$ is constant over the speed difference $\Delta n_{GK}$ at the gear clutch which is to be reduced. Thus, at a high braking torque $M_{Br}$ the transmission brake can no longer be used below a certain speed difference $\Delta n_{GK}$, or the transmission brake may have such a low braking torque $M_{Br}$ that the synchronization of the target gear and hence the upshift process as a whole are greatly delayed.

SUMMARY OF THE INVENTION

Against that background the purpose of the present invention is to indicate a method whereby, in a drivetrain of the type mentioned to begin with, an upshift can be carried out more rapidly without special design measures.

This objective is achieved according to the invention in that as the input speed $n_{GKE}$ approaches the output speed $n_{GKA}$ of the gear clutch of the target gear, i.e. as the speed difference $\Delta n_{GK} = n_{GKE} - n_{GKA}$ at the gear clutch of the target gear approaches the value zero, to finish the synchronization the separator clutch is partially engaged and then, approximately at the same time as the transmission brake is released, disengaged again.

The clutch torque $M_K$ transmitted via the separator clutch from the drive motor to the input shaft of the gearshift transmission opposes the braking torque $M_{Br}$ applied by the transmission brake on the input shaft or on a countershaft in drive connection with the input shaft, and so brings about a rapid termination of the synchronization of the target gear or its gear clutch effected by the transmission brake. Since the clutch torque $M_K$ of the separator clutch is also supported by the driveshaft (crankshaft) of the drive motor, the braking of the driveshaft caused thereby also supports and accelerates the shift-related speed adaptation of the drive motor.

The speeding up of the target gear synchronization and thus of the upshift process as a whole, made possible by actuating the separator clutch, is achieved essentially in that with an unchanged braking torque $M_{Br}$ the transmission brake is actuated for a longer time and/or a higher braking torque $M_{Br}$ is set at the transmission brake.

A higher braking torque $M_{Br}$ of the transmission brake can be produced either structurally by using a more powerful transmission brake, or by operating the existing transmission brake with a higher contact force or contact pressure.

Expediently, engaging the separator clutch during synchronization of the target gear begins when the speed difference at the gear clutch of the target gear reaches or falls below a specifiable upper, first speed difference limit $\Delta n_{GK\_Gr1}$.

Likewise, it is expedient for the disengagement of the separator clutch during the synchronization of the target gear to begin when the speed difference at the gear clutch of the target gear reaches or falls below a specifiable lower, second speed difference limit $\Delta n_{GK\_Gr2}$; ($|\Delta n_{GK\_Gr2}| < |\Delta n_{GK\_Gr1}|$).

Whereas, as explained at the start, the transmission brake is not adjustable but can only be set to a constant braking torque $M_{Br}$ when engaged and then released again, the automated controllable separator clutch is designed for controlling starting and shifting processes and for synchronizing the target gear concerned during downshifts. Thus, in the present case the adjustability of the clutch torque $M_K$ is also used during upshifts to terminate the synchronization in that, advantageously, the engagement and disengagement of the separator clutch are respectively controlled as a function of the momentary speed difference at the gear clutch of the target gear, namely $\Delta n_{GK} = n_{GKE} - n_{GKA}$.

In this case, when the separator clutch is being engaged the increase gradient of its torque $dM_K/dt > 0$ and the level of the clutch torque $M_K$ set are expediently adjusted inversely proportionally to the speed difference $\Delta n_{GK}$ ($dM_K/dt \sim 1/\Delta n_{GK}$; $M_K \sim 1/\Delta n_{GK}$), and when the separator clutch is being disengaged the torque decrease gradient $dM_K/dt < 0$ of the clutch torque $M_K$ set is expediently adjusted absolutely proportionally to the speed difference $\Delta n_{GK}$ ($|dM_K/dt| \sim \Delta n_{GK}$).

This means that when there is a larger speed difference $\Delta n_{GK}$, during the torque increase phase the clutch torque $M_K$ is increased less rapidly and to a lesser extent than when the speed difference $\Delta n_{GK}$ is smaller, so as not to counteract the synchronization by the braking torque $M_{Br}$ of the transmission brake too early and too much.

In contrast, when there is a lower speed difference $\Delta n_{GK}$, during the torque decrease phase the clutch torque $M_K$ of the separator clutch is reduced more rapidly than when the speed difference $\Delta n_{GK}$ is larger, in order to maintain a speed difference $\Delta n_{GK}$ that is advantageous for the meshing of the gear clutch of the target gear and to avoid undesired acceleration of the input shaft of the gearshift transmission by the clutch torque $M_K$ of the separator clutch.

For similar reasons it is also advantageous for the engagement and disengagement of the separator clutch to be regulated in each case as a function of the momentary speed difference gradient $d \Delta n_{GK}/dt < 0$ at the gear clutch of the target gear, in such manner that when the separator clutch is being engaged the torque reduction gradient $d n_{GK}/dt > 0$ and the level of the clutch torque $M_K$ set is expediently proportional to the absolute value of the speed difference gradient $d\Delta n_{GK}/dt < 0$ ($dM_K/dt \sim |d\Delta n_{GK}/dt|$, $M_K \sim |d\Delta n_{GK}/dt|$), whereas when the separator clutch is being disengaged the torque decrease gradient $dM_K/dt < 0$ and the level of the clutch torque $M_K$ set is expediently adjusted absolutely proportionally to the absolute value of the speed difference gradient $d\Delta n_{GK}/dt$ ($|dM_K/dt| \sim |d\Delta n_{GK}/dt|$).

In this way, when the target gear synchronization by the transmission brake is more rapid the clutch torque $M_K$ of the separator clutch during the torque reduction phase is reduced more rapidly and to a greater extent than when synchronization is slower, in order to counteract the slowing down of the input shaft by the braking torque $M_{Br}$ of the transmission brake at the right time and effectively, and in the torque reduction phase when the target gear synchronization is more rapid, the torque is reduced more rapidly than when synchronization is slower, in order to maintain a speed difference $\Delta n_{GK}$ that is advantageous for the meshing of the gear clutch of the target gear and to avoid undesired acceleration of the input shaft of the gearshift transmission by the clutch torque $M_K$ of the separator clutch.

Thus, by virtue of the method according to the invention, during an upshift the synchronization of the target gear or its gear clutch, and so also the upshift as a whole, are substantially accelerated without the need for special design measures for this. The method according to the invention can easily be adopted in an existing clutch- or transmission-control unit in the form of a program.

BRIEF DESCRIPTION OF THE DRAWINGS

To clarify the invention the description of a drawing with an example embodiment is attached. This shows, in FIG. 1, the speed and torque variations during a synchronization of the target gear in accordance with the invention in an upshift.

DETAILED DESCRIPTION OF THE PREFERRED EMBODIMENTS

In the diagrams of FIG. 1, for an upshift sequence according to the invention the time variations of characteristic operating parameters of a drivetrain are reproduced, the drivetrain comprising an automated gearshift transmission provided with unsynchronized gear clutches, whose input shaft is connected via an automated, controllable separator clutch with the driveshaft of a drive motor, and which also comprises a transmission brake which is in drive connection with the input shaft. Part-diagram a) shows the speed variations of the input shaft $n_{GE}$ of the gearshift transmission and of the driveshaft of the drive motor $n_M$, part-diagram b) shows the torque variation $M_{Br}$ of the transmission brake, and part-diagram c) shows the torque variation of the torque $M_K$ that can be transmitted by the separator clutch.

At the beginning of the upshift process, from time t1 the load reduction at the drive motor and the full disengagement of the separator clutch take place almost simultaneously. For this, in part-diagram c) the fully engaged condition of the separator clutch is denoted $M_K=1$ and its fully disengaged condition $M_K=0$. After the disengagement of the previously load-carrying loaded gear, from time t2 the transmission brake is actuated in order to synchronize the higher target gear, i.e. to adapt the input speed $n_{GKE}$ of the input-side part of the gear clutch of the target gear, which is in drive connection with the input shaft, by braking, to the output speed $n_{GKA}$ of the output-side part of the gear clutch of the target gear, which is in drive connection with the drive wheels of the motor vehicle via the output shaft and an axle drive. For this the transmission brake, which is not designed to be regulated, starts from a non-actuated condition denoted in part-diagram b) by $M_{Br}=0$, and is set to a substantially constant braking torque $M_{Br}$ denoted in part-diagram b) by $M_{Br}=1$.

As the speed difference $\Delta n_{GK}=n_{GKE}-n_{GKA}$ of the gear clutch of the target gear decreases, when a specified upper first speed difference limit value $\Delta n_{GK\_Gr1}$ is reached, from time t3 the separator clutch is partially engaged so that it opposes the braking of the input shaft by the transmission brake with a relatively low clutch torque $M_K<<1$. During this the increase gradient $dM_K/dt>0$ at the clutch and the level of the clutch torque $M_K$ are regulated at least as a function of the momentary speed difference $\Delta n_{GK}$ at the gear clutch of the target gear. In the speed variation of the input shaft depicted in part-diagram a) the speed difference $\Delta n_{GK}$ and the speed difference limit $\Delta n_{GK\_Gr1}$ at the gear clutch are formed, in each case, by a multiplication by the gear ratio $i_{GK}$ between the input shaft and the gear clutch of the target gear ($\Delta n_{GE}=n_{GE}-n_{GE\_Ziel}=i_{GK}*\Delta n_{GK}$ and $\Delta n_{GE\_Gr1}=i_{GK}*\Delta n_{GK-Gr1}$).

As the speed difference $\Delta n_{GK}=n_{GKE}-n_{GKA}$ at the gear clutch of the target gear decreases further, when a specified lower second speed difference limit $\Delta n_{GK\_Gr2}$ ($\Delta n_{GE\_Gr2}=i_{GK}*\Delta n_{GK\_Gr2}$) is reached, from time t4 and approximately simultaneously the transmission brake is disengaged ($M_{Br}=0$) and the separator clutch is again disengaged completely ($M_K=0$). Expediently, the separator clutch is disengaged in such manner as to avoid any undesired acceleration of the input shaft and to maintain a small speed difference $n_{GK}$ that assists the meshing of the clutch teeth of the gear clutch of the target gear. For this, the reduction gradient $dM_K/dt<0$ of the clutch torque $M_K$ is regulated at least as a function of the momentary speed difference $\Delta n_{GK}$ at the gear clutch of the target gear.

After reaching the synchronized speed and engaging the gear clutch of the target gear, from time t5 the separator clutch is completely engaged and the previously already begun speed adaptation of the drive motor supported by the partial engagement of the separator clutch is completed (see the variation of the engine speed $n_M$).

Since, by virtue of the transient actuation of the separator clutch during the slowing down, the input shaft of the transmission is in effect "caught" by the transmission brake, the transmission brake can be actuated for longer with no change of the braking torque $M_{Br}$ on even with a higher braking torque $M_{Br}$. Without any additional design complexity this speeds up the synchronization of the target gear and thus shortens the upshift process as a whole.

INDEXES $i_{GK}$ Gear ratio between input shaft and gear clutch
$M_{Br}$ Braking torque
$M_K$ Clutch torque
$dM_K/dt$ Momentary increase or reduction gradient
n Speed
$n_{GE}$ Input shaft speed
$n_{GE\_Ziel}$ Target speed of the input shaft
$n_{GKA}$ Output speed at the gear clutch
$n_{GKE}$ Input speed at the gear clutch
$n_M$ Engine speed
$\Delta n$ Speed difference
$\Delta n_{GE}$ Speed difference at the input shaft
$\Delta n_{GE\_Gr1}$ First speed difference limit at the input shaft
$\Delta n_{GE\_Gr2}$ Second speed difference limit at the input shaft
$\Delta n_{GK}$ Speed difference at the gear clutch
$\Delta_{GK\_Gr1}$ First speed difference limit at the gear clutch
$\Delta n_{GK\_Gr2}$ Second speed difference limit at the gear clutch
$d\Delta n_{GK\_Gr1}/dt$ Speed difference gradient at the gear clutch
t Time
t1 to t5 Time points

The invention claimed is:

1. A shift control method for an automated gearshift transmission, the method comprising the steps of:
    arranging the transmission between a drive motor and an axle drive in a drivetrain of a motor vehicle;
    providing the transmission with both an input shaft and a plurality of unsynchronized gear clutches;
    providing an automatically controllable separator clutch for coupling the input shaft to a driveshaft of the drive motor;
    providing a transmission brake in driving connection with the input shaft;
    providing a gear clutch of a target gear, which is one of the plurality of unsynchronized gear clutches; and
    synchronizing the target gear for an upshift by:
        fully disengaging the separator clutch;
        applying a substantially constant braking torque (MBr) via the transmission brake; and
        completing synchronization by:
            partially engaging the separator clutch as an input speed ($n_{GKE}$) of the gear clutch of the target gear approaches an output speed ($n_{GKA}$) of the gear clutch of the target gear, and
            re-disengaging the separator clutch and releasing the transmission brake at approximately a same time.

2. The method according to claim 1, further comprising the step of beginning the partial engagement of the separator clutch (at t3) when a speed difference between the input speed (nGKE) of the gear clutch of the target gear and the output speed (nGKA) of the gear clutch of the target gear one of reaches a specified upper first speed difference limit ($\Delta n_{GK\_Gr1}$) and falls below the specified upper first speed difference limit ($\Delta n_{GK\_Gr1}$).

3. The method according to claim 2, further comprising the step of beginning the re-disengagement of the separator clutch (at t4) when a speed difference, between the input speed (nGKE) of the gear clutch of the target gear and the output speed (nGKA) of the gear clutch of the target gear, one of reaches a specified lower second speed difference limit ($\Delta n_{GK\_Gr2}$; $|\Delta n_{GK\_Gr2}|=|\Delta n_{GK\_Gr1}|$) and falls below the specified lower second speed difference limit ($\Delta n_{GK\_Gr2}$; $|\Delta n_{GK\_Gr2}|<|\Delta n_{GK\_Gr1}|$).

4. The method according to claim 1, further comprising the step of regulating the partial engagement and the re-disengagement of the separator clutch as a function of a momentary speed difference between the input speed (nGKE) of the gear clutch of the target gear and the output speed (nGKA) of the gear clutch of the target gear ($\Delta n_{GK}=n_{GKE}-n_{GKA}$).

5. The method according to claim 4, further comprising the step of regulating a torque increase gradient of the separator clutch ($dM_K/dt>0$) and a level of a clutch torque ($M_K$) when partially engaging the separator clutch, the torque increase gradient of the separator clutch ($dMK/dt>0$) and the level of the clutch torque (MK) both being set inversely proportionally to the momentary speed difference ($\Delta n_{GK}$), ($dM_K/dt \sim 1/\Delta n_{GK}$, $M_K \sim 1/\Delta n_{GK}$).

6. The method according to claim 4, further comprising the step of regulating a torque reduction gradient of the separator clutch ($dM_K/dt<0$) and a level of a clutch torque ($M_K$) when re-disengaging the separator clutch, the torque reduction gradient of the separator clutch ($dMK/dt<0$) and the level of the clutch torque (MK) both being set absolutely proportionally to the momentary speed difference ($\Delta nGK$) ($|dM_K/dt| \sim \Delta n_{GK}$).

7. The method according to claim 1, further comprising the step of regulating the partial engagement and the re-disengagement of the separator clutch as a function of a momentary speed difference gradient ($d\Delta n_{GK}/dt<0$), the momentary speed difference being between the input speed (nGKE) of the gear clutch of the target gear and the output speed (nGKA) of the gear clutch of the target gear.

8. The method according to claim 7, further comprising the step of regulating a torque increase gradient ($dM_K/dt>0$) and a level of a clutch torque ($M_K$) when partially engaging the separator clutch, the torque increase gradient ($dMK/dt>0$) and the level of the clutch torque (MK) both being set proportionally to an absolute value of the momentary speed difference gradient ($d\Delta n_{GK}/dt<0$) ($dM_K/dt \sim |d\Delta n_{GK}/dt|$, $M_K \sim |d\Delta n_{GK}/dt|$).

9. The method according to claim 7, further comprising the step of regulating a torque reduction gradient ($dM_K/dt<0$) and a level of a clutch torque ($M_K$) when re-disengaging the separator clutch, the torque reduction gradient ($dM_K/dt<0$) and the level of the clutch torque ($M_K$) both being set absolutely proportionally to an absolute value of the speed difference gradient ($d\Delta n_{GK}/dt$) ($|dM_K/dt| \sim |d\Delta n_{GK}/dt|$).

10. The method according to claim 1, further comprising the step of beginning the re-disengagement of the separator clutch (at t4) when a speed difference, between the input speed (nGKE) of the gear clutch of the target gear and the output speed (nGKA) of the gear clutch of the target gear, one of reaches a specified second speed difference limit ($\Delta n_{GK\_Gr2}$; $|\Delta n_{GK\_Gr2}|=|\Delta n_{GK\_Gr1}|$) and falls below the second specified speed difference limit ($\Delta n_{GK\_Gr2}$; $|\Delta n_{GK\_Gr2}|<|\Delta n_{GK\_Gr1}|$).

11. A shift control method for an automated gearshift transmission, the method comprising the steps of:
arranging the transmission between a drive motor and an axle drive in a drivetrain of a motor vehicle;
providing the transmission with a plurality of unsynchronized gear clutches;
providing an automatic separator clutch for controlling engagement of a drive shaft of the drive motor with a transmission input shaft;
providing a gear clutch of a target gear, which is one of the plurality of unsynchronized gear clutches
providing a gear clutch of a current gear, which is one of the plurality of unsynchronized gear clutches
initiating an upshift from the current gear to the target gear;
disengaging the transmission input shaft from the drive shaft of the drive motor, via the separator clutch, and disengaging the gear clutch of the current gear;
applying a braking torque ($_{Mbr}$) to the transmission input shaft, via a transmission brake, to reduce an input speed ($n_{GKE}$) of the gear clutch of the target gear toward an output speed ($n_{GKA}$) of the gear clutch of the target gear;
completing synchronization of the gear clutch of the target gear by partially engaging the separator clutch and substantially simultaneously disengaging the separator clutch and the transmission brake.

* * * * *